United States Patent
Chen et al.

(10) Patent No.: US 7,454,076 B2
(45) Date of Patent: *Nov. 18, 2008

(54) HYBRID VARIABLE LENGTH CODING METHOD FOR LOW BIT RATE VIDEO CODING

(75) Inventors: Wen-hsiung Chen, Sunnyvale, CA (US); Fang Wu, Pleasanton, CA (US); Gregory D. Pelton, Raleigh, NC (US); John A. Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 907 days.

This patent is subject to a terminal disclaimer.

(21) Appl. No.: 10/869,229

(22) Filed: Jun. 15, 2004

(65) Prior Publication Data

US 2005/0276487 A1    Dec. 15, 2005

(51) Int. Cl.
*G06K 9/36* (2006.01)
*H03M 7/34* (2006.01)

(52) U.S. Cl. .......................... 382/245; 341/51
(58) Field of Classification Search ................ 382/245; 341/51
See application file for complete search history.

(56) References Cited

U.S. PATENT DOCUMENTS

| | | | |
|---|---|---|---|
| 4,420,771 A * | 12/1983 | Pirsch | 341/56 |
| 4,698,672 A | 10/1987 | Chen et al. | 358/136 |
| 4,706,265 A | 11/1987 | Furukawa | 375/122 |
| 4,813,056 A | 3/1989 | Fedele | 375/27 |
| 4,821,119 A | 4/1989 | Gharavi | 375/240.16 |
| 4,845,560 A | 7/1989 | Kondo et al. | 358/133 |
| 4,858,017 A | 8/1989 | Torbey | 358/426 |

(Continued)

FOREIGN PATENT DOCUMENTS

EP    0 266 049 A2    5/1988

(Continued)

OTHER PUBLICATIONS

G. Cote, B. Erol, M. Gallant, & F. Kossentini, "H.263+: Video Coding at Low Bit Rates" in *IEEE Transactions on Circuits and Systems for Video Technology*, vol. 8, No. 7, Nov. 1998.

(Continued)

*Primary Examiner*—Wenpeng Chen
(74) *Attorney, Agent, or Firm*—Dov Rosenfeld; Inventek (57) ABSTRACT

A method and an apparatus of image compression, and a memory to store a data structure for compression. The method includes, for an ordered series of quantized coefficients of a transform of an image block, forming from the series events each with a run of non-zero-valued coefficients in a first contiguous region defined by a breakpoint, a run of zero-valued coefficients in the first region, or a run of zero-valued coefficients in a second region defined by the breakpoint. The breakpoint defines the first region and a second continuous region in the series. Codewords are formed for each runlength of non-zero-valued and zero-valued coefficients in the first region according to a first and a second coding method, respectively, and a codeword is formed for the non-zero amplitudes according to a first amplitude coding method. The runlengths of zero-valued coefficients in the second region are encoding using a third coding method.

63 Claims, 3 Drawing Sheets

U.S. PATENT DOCUMENTS

| | | | |
|---|---|---|---|
| 4,920,426 A | 4/1990 | Hatori et al. | 358/433 |
| 4,922,510 A | 5/1990 | Brusewitz | 375/122 |
| 4,937,573 A | 6/1990 | Silvio et al. | 341/67 |
| 4,985,700 A | 1/1991 | Mikami | 341/59 |
| 4,985,766 A | 1/1991 | Morrison et al. | 358/133 |
| 5,006,930 A | 4/1991 | Stroppiana et al. | 358/133 |
| 5,045,938 A | 9/1991 | Sugiyama | 358/133 |
| 5,062,152 A | 10/1991 | Faulkner | 359/185 |
| 5,086,488 A | 2/1992 | Kato et al. | 382/56 |
| 5,128,758 A | 7/1992 | Azadegan et al. | 358/133 |
| 5,136,376 A | 8/1992 | Yagasaki et al. | 358/133 |
| 5,162,795 A | 11/1992 | Shirota | 341/67 |
| 5,166,684 A | 11/1992 | Juri et al. | 341/67 |
| 5,179,442 A | 1/1993 | Azadegan et al. | 358/133 |
| 5,226,082 A | 7/1993 | Kustka | 380/46 |
| 5,253,053 A | 10/1993 | Chu et al. | 358/133 |
| 5,253,055 A | 10/1993 | Civanlar et al. | 358/133 |
| 5,291,282 A | 3/1994 | Nakagawa et al. | 348/384 |
| 5,298,991 A | 3/1994 | Yagasaki et al. | 348/416 |
| 5,301,032 A | 4/1994 | Hong et al. | 358/261.2 |
| 5,307,163 A | 4/1994 | Hatano et al. | 348/415 |
| 5,319,457 A | 6/1994 | Nakahashi et al. | 348/387 |
| 5,337,087 A | 8/1994 | Mishima | 348/405 |
| 5,363,097 A | 11/1994 | Jan | 341/67 |
| 5,371,811 A | 12/1994 | Morrison et al. | 382/56 |
| 5,400,075 A | 3/1995 | Savatier | 348/384 |
| 5,402,244 A | 3/1995 | Kim | 358/261.2 |
| 5,446,744 A | 8/1995 | Nagasawa et al. | 371/37.4 |
| RE35,093 E | 11/1995 | Wang et al. | 348/413 |
| 5,475,501 A | 12/1995 | Yagasaki | 358/426 |
| 5,479,527 A | 12/1995 | Chen | 382/232 |
| 5,488,367 A | 1/1996 | Kitamura | 341/106 |
| 5,488,418 A | 1/1996 | Mishima et al. | 348/398 |
| 5,488,616 A | 1/1996 | Takishima et al. | 371/30 |
| 5,491,480 A | 2/1996 | Jan et al. | 341/67 |
| 5,528,628 A | 6/1996 | Park et al. | 375/240 |
| 5,539,401 A | 7/1996 | Kumaki et al. | 341/67 |
| 5,640,420 A | 6/1997 | Jung | 375/240 |
| 5,642,115 A | 6/1997 | Chen | 341/67 |
| 5,644,305 A | 7/1997 | Inoue et al. | 341/67 |
| 5,648,774 A | 7/1997 | Hsieh | 341/67 |
| 5,650,782 A | 7/1997 | Kim | 341/67 |
| 5,696,558 A | 12/1997 | Tsukamoto | 348/405 |
| 5,717,394 A | 2/1998 | Schwartz et al. | 341/51 |
| 5,731,836 A | 3/1998 | Lee | 348/402 |
| 5,740,283 A | 4/1998 | Meeker | 382/248 |
| 5,751,232 A | 5/1998 | Inoue et al. | 341/63 |
| 5,767,800 A | 6/1998 | Machida et al. | 341/67 |
| 5,767,908 A | 6/1998 | Choi | 348/403 |
| 5,774,594 A | 6/1998 | Kitamura | 382/239 |
| 5,793,432 A | 8/1998 | Mishima et al. | 348/423 |
| 5,793,897 A | 8/1998 | Jo et al. | 382/246 |
| 5,818,877 A | 10/1998 | Tsai et al. | 375/241 |
| 5,822,463 A | 10/1998 | Yokose et al. | 382/251 |
| 5,832,130 A | 11/1998 | Kim | 382/248 |
| 5,844,611 A | 12/1998 | Hamano et al. | 348/403 |
| 5,852,469 A | 12/1998 | Nagai et al. | 348/384 |
| 5,883,589 A | 3/1999 | Takishima et al. | 341/67 |
| 5,923,813 A | 7/1999 | Okamoto et al. | 386/109 |
| 5,956,153 A | 9/1999 | Hirabayashi | 358/433 |
| 5,982,437 A | 11/1999 | Okazaki et al. | 348/413 |
| 5,999,111 A | 12/1999 | Park et al. | 341/67 |
| 6,014,095 A | 1/2000 | Yokoyama | 341/67 |
| 6,104,754 A | 8/2000 | Chujoh et al. | 375/240 |
| 6,111,914 A | 8/2000 | Bist | 375/240 |
| 6,118,822 A | 9/2000 | Bist | 375/240 |
| 6,140,944 A | 10/2000 | Toyoyama | 341/63 |
| 6,144,322 A | 11/2000 | Sato | 341/67 |
| 6,198,848 B1 | 3/2001 | Honma et al. | 382/232 |
| 6,218,968 B1 | 4/2001 | Smeets et al. | 341/65 |
| 6,229,460 B1 | 5/2001 | Tsai et al. | 341/67 |
| 6,256,064 B1 | 7/2001 | Chujoh et al. | 348/240.23 |
| 6,278,801 B1 | 8/2001 | Boon | 382/246 |
| 6,304,607 B1 | 10/2001 | Talluri et al. | 375/240.27 |
| 6,339,386 B1 | 1/2002 | Cho | 341/67 |
| 6,388,588 B2 | 5/2002 | Kitamura | 341/67 |
| 6,404,929 B1 | 6/2002 | Boon | 382/233 |
| 6,408,029 B1 | 6/2002 | McVeigh et al. | 375/240.13 |
| 6,445,314 B1 | 9/2002 | Zhang et al. | 341/67 |
| 6,445,739 B1 | 9/2002 | Shen et al. | 375/240.03 |
| 6,477,280 B1 | 11/2002 | Malvar | 382/245 |
| 6,771,828 B1 | 8/2004 | Malvar | 382/240 |
| 2004/0228540 A1 | 11/2004 | Chen et al. | 382/246 |
| 2005/0226513 A1* | 10/2005 | Wallace et al. | 382/232 |

FOREIGN PATENT DOCUMENTS

| | | |
|---|---|---|
| WO | WO 93/18616 | 9/1993 |
| WO | WO 03/090421 | 10/2003 |

OTHER PUBLICATIONS

T. Chujoh & Y. Kikuchi, "An improved variable length coding", *Joint Video Team (JVT) of ISO/IEC MPEG & ITU-T VCEG*, 2nd Meeting: Geneva, CH, Jan. 29-Feb. 1, 2002.

M. Luttrell, J. Wen, H. Yao, and J. Villasen: "Robust Low Bit Rate Wireless Video Communications," Final Report, Project 97-193, University of California MICRO project, available on http://www.ucop.edu/research/micro/97_98/97_193.pdf.

P.N. Tudor, "MPEG-2 Video Compression", IEE J Langham Thompson Prize, *Electronics & Communication Engineering Journal*, Dec. 1995. Available on http://www.bbc.co.uk/rd/pubs/papers/paper_14/paper_14.html.

"H.264/MPEG-4 AVC Video Compression Tutorial", *VideoLocus*, 2002, available on http://www.videlocus.com.

"MPEG-1 Video Codec", pp. 1-8, available on http://www.cmlab.csie.ntu.edu.tw/cml/dsp/training/coding/mpeg1/.

K. Takagi, "Reversiblity of Code", *Joint Video Team (JVT) of ISO/IEC MPEG & ITU-T VCEG*, 2nd Meeting: Geneva, CH, Jan. 29-Feb. 1, 2002.

A. Bist, "An Adaptive Quantization Scheme for H.263++", ITU-Telecommunication Standardization Sector q15a49, Working Party 15/1, Expert's Group on Very Low Bitrate Visual Telephony, Portland, Jun. 24-27, 1997.

Reed, E.C. and Lim, J.S. "Efficient Coding of DCT Coefficients by Joint Position-Dependent Encoding." *Proceedings of the 1998 IEEE International Conference on Acoustics, Speech and Signal Processing*, May 12, 1998, pp. 2817-2820, IEEE, New York, NY.

Cheung, K.M. and Kiely, A. "An Efficient Variable Length Coding Scheme for an IID Source." *Proceedings of the Data Compression Conference*, Mar. 28, 1995, pp. 182-191, IEEE Computer Society Press, Los Alamitos, CA.

Simon, S. and De Vriendt, J. "Progressive Image Transmission with Run-Length Coding." *Journal on Communications*, vol. 45, May 1994, pp. 45-50, Budapest, Hungary.

Jeon, B., Park, J. and Jeong, J. "Huffman Coding of DCT Coefficients Using Dynamic Codeword Assignment and Adaptive Codebook Selection." *Signal Processing Image Communication*, vol. 12, No. 3, Jun. 1, 1998, pp. 253-262, Elsevier Science Publishers, Amsterdam, NL.

Chandra, A. and Chakrabarty, K. "Reduction of SOC Test Data Volume, Scan Power and Testing Time Using Alternating Run-length Codes." *Proceedings of the 39th Design Automation Conference*, Jun. 10, 2002, pp. 673-678, ACM, New York, NY.

Taubman, D.S. "Section 2.4.3: Run-Length Coding." *JPEG2000: Image Compression Fundamentals, Standards, and Practice*, 2002, Kluwer Academic Publishers, Dordrecht, NL.

Golomb, S. "Run-Length Encodings." *IEEE Transactions on Information Theory*, vol. 12, No. 3, Jul. 1966, pp. 399-401.

Gallager, R.G. and Van Voorhis, D.C. "Optimal Source Codes for Geometrically Distributed Integer Alphabets." *IEEE Transactions on Information Theory*, vol. IT-21, No. 2, Mar. 1975, pp. 228-230.

* cited by examiner

HYBRID VARIABLE LENGTH CODING METHOD FOR LOW BIT RATE VIDEO CODING

RELATED PATENT APPLICATIONS

This invention is related to U.S. patent application Ser. No. 10/342,537 to inventors Chen et al., filed Jan. 15, 2003 and titled AN EXTENSION OF TWO-DIMENSIONAL VARIABLE LENGTH CODING FOR IMAGE COMPRESSION. U.S. patent application Ser. No. 10/342,537 is incorporated herein by reference, and the methods described therein are each called the "Extended 2D-VLC Method" herein.

BACKGROUND

Two-dimensional variable length coding (2D-VLC) includes collecting or assuming the statistics of two dimensional block transform coefficient events that are each a run of the most-likely-to-occur amplitude, e.g., 0, followed by another amplitude. The coding includes assigning variable length codes, e.g., optimal codes such as Huffman codes or Arithmetic codes, to each event. In the description herein, 0 is assumed to be the most-likely-to-occur amplitude. The collecting or assuming statistics includes tracking the quantized non-zero-valued coefficient amplitudes and the number of zero-valued coefficients preceding the non-zero amplitude, i.e., tracking the runlengths of zeros which precedes any non-zero amplitude along a specified path, e.g., a zigzag scan path for a block of coefficients, e.g., an n by n coefficient block. Table 1 below shows by example the statistics tabulated as a two dimensional table:

TABLE 1

2D-VLC statistics

| | | Runlength of preceding 0's | | | | | | | |
|---|---|---|---|---|---|---|---|---|---|
| | | 0 | 1 | 2 | 3 | 4 | 5 | 6 | .. |
| Coeff. Amp. | 1 | S10 | S11 | S12 | S13 | S14 | S15 | S16 | .. |
| | 2 | S20 | S21 | S22 | S23 | S24 | S25 | S26 | .. |
| | 3 | S30 | S31 | S32 | S33 | S34 | 535 | S36 | .. |
| | 4 | S40 | S41 | S42 | S43 | S44 | 545 | S46 | .. |
| | 5 | S50 | S51 | S52 | S53 | S54 | S55 | S56 | .. |
| | 6 | S60 | S61 | S62 | S63 | S64 | S65 | S66 | .. |
| | 7 | S70 | S71 | S72 | S73 | S74 | S75 | S76 | .. |
| | 8 | S80 | S81 | S82 | S83 | S84 | S85 | S86 | .. |
| | 9 | S90 | S91 | S92 | S93 | S94 | S95 | S96 | .. |
| | . | . | . | . | . | . | . | . | .. |

In the table, $S_{ij}$ is the likelihood expressed, for example, as a relative number of occurrences of an amplitude of i, i=1, 2, ... occurring after a run of j 0's, j=0, 1, 2, ....

A variable length code such as an optimal code is then assigned to each of the events that have an $S_{ij}$ above, with the most-likely-to-occur element—typically S10 for the case of encoding a block of transform coefficients in transform coding—having the shortest number of bits, and the least occurring event coded using the longest number of bits. Table 2 below shows an example of a 2D-VLC table:

TABLE 2

2D-VLC statistics

| | | Runlength of preceding 0's | | | | | | | |
|---|---|---|---|---|---|---|---|---|---|
| | | 0 | 1 | 2 | 3 | 4 | 5 | 6 | .. |
| Coeff. Amp. | 1 | C10 | C11 | C12 | C13 | C14 | C15 | C16 | .. |
| | 2 | C20 | C21 | C22 | C23 | C24 | C25 | C26 | .. |
| | 3 | C30 | C31 | C32 | C33 | C34 | 535 | C36 | .. |
| | 4 | C40 | C41 | C42 | C43 | C44 | 545 | C46 | .. |
| | 5 | C50 | C51 | C52 | C53 | C54 | C55 | C56 | .. |
| | 6 | C60 | C61 | C62 | C63 | C64 | C65 | C66 | .. |
| | 7 | C70 | C71 | C72 | C73 | C74 | C75 | C76 | .. |
| | 8 | C80 | C81 | C82 | C83 | C84 | C85 | C86 | .. |
| | 9 | C90 | C91 | C92 | C93 | C94 | C95 | C96 | .. |
| | . | . | . | . | . | . | . | . | .. | where $C_{ij}$ is the codeword used to encode the event of the combination of j consecutive 0-valued coefficients followed by a single non-zero coefficient of amplitude i, j=0, 1, ... and i=1, 2, ....

2D-VLC is used in common transform coding methods such as JPEG, MPEG1, MPEG2, ITU-T-261, etc., as follows. For motion video, an image is divided into blocks, e.g., 8 by 8 or 16 by 16 blocks. Each image is classified as interframe or intraframe. Interframe images are typically post motion compensation. The blocks of the image are transformed and the transform coefficients are quantized. The quantized transform coefficients are then coded along a specified path according to a 2D-VLC table. Typically, interframe and intraframe images have different 2D-VLC tables. The DC component is typically separately encoded. Furthermore, the 2D-LVLC table may be truncated so that the least frequently occurring events use an escape code followed by a fixed length code. A special "EOB" code is used to indicate the end of block when all remaining coefficients are zero.

Still images are similarly encoded, e.g., in the same manner as an intraframe image for motion video.

Figure 1:
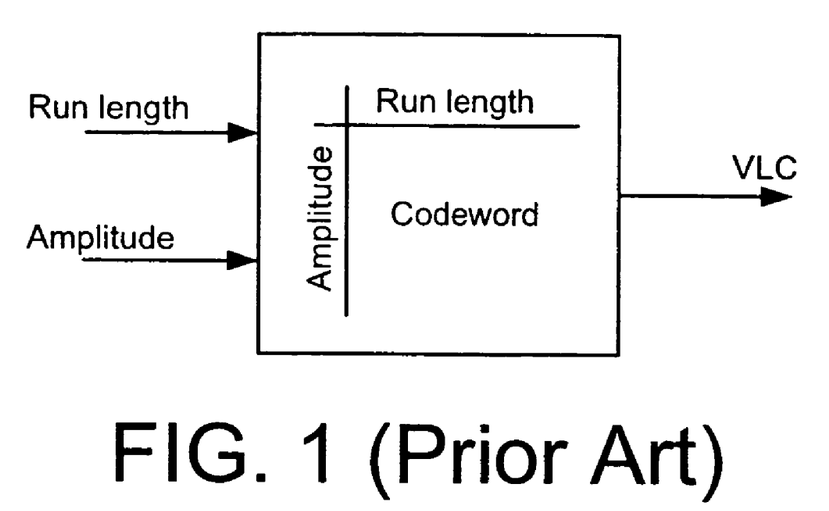
FIG. 1 shows how a prior art 2-D VLC method may be implemented by a table look-up.

FIG. 1 shows how a table lookup may be used to implement a 2D-VLC scheme. Prior to the table look up, the runlength of zero amplitudes preceding any non-zero amplitude and the non-zero amplitude are determined. The table look up uses a 2D table for those likely events encoded using variable length encoding. An escape code together with a fixed length codes is used for relatively less likely-to-occur combinations The advantage of 2D_VLC is that both the position of each non-zero-valued coefficient as indicated by the runlength, and the quantized amplitude value are coded simultaneously as a pair using one 2D-VLC table. This may result in shorter codes, i.e., codes that use fewer bits than using separate VLC tables for each non-zero-valued coefficient and for its amplitude.

Because of the widespread use of image coding, many patents have been issued on different forms of VLC. U.S. Pat. No. 4,698,672 issued Oct. 6, 1987 to Wen-hsiung Chen, one of the inventors of the present invention, for example described one form of a two-dimensional variable length coding method.

Extensions and variations to the common 2D-VLC method are known. For example, the ITU H.263 compression standard defines one such variation sometimes called three-dimensional VLC (3D-VLC). See PCT patent publication WO 9318616 published Sep. 16, 1993 titled PICTURE DATA ENCODING METHOD and also the ITU-T H.263 standard.

In 3D-VLC, each symbol ("event") is a tripilet (LAST, RUN, LEVEL) that includes: LAST, a binary flag that indicates whether or not the current non-zero amplitude-value is the last non-zero coefficient in the block, RUN, the run-length of zero-value coefficients that precede the current non-zero amplitude, i.e., the number of zeroes since the last non-zero coefficient amplitude, and LEVEL, the current non-zero coefficient amplitude value. Thus, there is no need for a separate EOB codeword; whether or not the non-zero coefficient is the last one is incorporated into the event.

Figure 2:
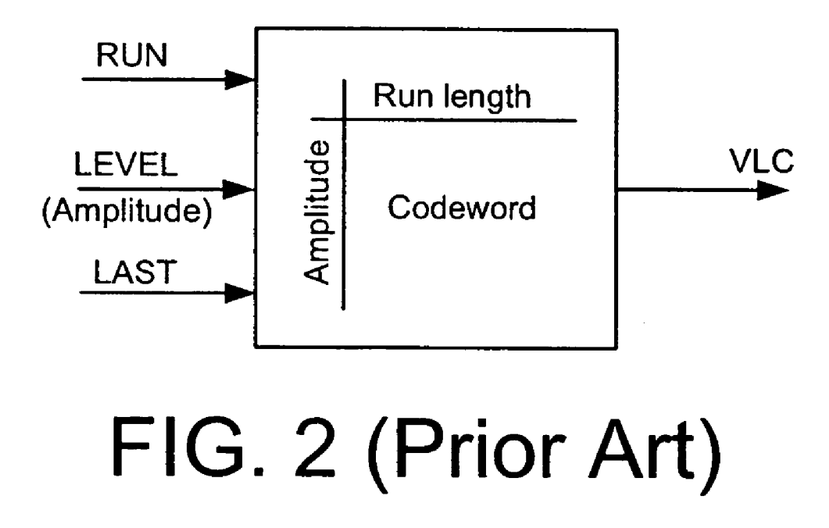
FIG. 2 shows how a common prior art variation of 2-D VLC called 3D-VLC may be implemented by a table look-up.

FIG. 2 shows how a table lookup may be used to implement 3D-VLC.

One deficiency of 2-D VLC methods is that every non-zero-valued coefficient needs to be accompanied by one runlength to identify its position. In block based transform coding, it may occur that there are a number of consecutive non-zero-valued coefficients along the pre-determined coding path. This may especially occur in intraframe coding and high bit rate interframe coding. The 2D-VLC method requires a separate runlength code, e.g., C10, C20, C30 . . . , etc., for each of the consecutive non-zero coefficient. Thus there is a need in the art for a method that provides for efficiently encoding a sequence of consecutive non-zero coefficient values.

Above-mentioned U.S. patent application Ser. No. 10/342, 537 to inventors Chen et al., filed Jan. 15, 2003 and titled AN EXTENSION OF TWO-DIMENSIONAL VARIABLE LENGTH CODING FOR IMAGE COMPRESSION describes the "Extended 2D-VLC Method" that includes encoding repetitions of some non-zero coefficient values.

One variant of the Extended 2D-VLC method provides codes for all the possible amplitude variations of consecutive coefficients that follow a set of zero-valued coefficients. This effectively reduced the runlength to 1 for all cases. The difficulty of this approach is that there are enormous numbers of patterns that can be generated from the amplitudes of consecutive coefficients. For example, with 32 quantization levels as defined in many common video coding standards, there are in the order of $32^n$ patterns that can be generated from n consecutive coefficients. As such, in practical implementation, only a limited number of most frequently appeared non-zero amplitude values such as 1 and 2 and limited number of lengths of consecutive non-zero-values, such as 3 or 4 consecutive values are regrouped for pattern matching.

Thus, there still may be inefficiency in using the called "Extended 2D-VLC Method' in practice.

Thus there still is a need in the art for a method that includes efficiently encoding runs of non-zero-valued coefficients that may occur in series of transform coefficients of blocks of an image.

One or more patents describing some existing 2D-VLC coding methods have recently been the subject of patent litigation. Thus, there is a need in the art for alternate methods that can replace commonly used 2D-VLC methods that have been the subject of such litigation.

SUMMARY

In one embodiment, the method includes establishing a breakpoint along the path of the ordering of the coefficients to identify a first, e.g., low-frequency region and a second, e.g., high frequency region. The encoding of low frequency coefficients includes coding the positions of consecutive non-zero-valued coefficients and consecutive zero-valued coefficients using runlength coding methods of the first kind and second kind, respectively. The method further includes coding the amplitude values of the non-zero-valued coefficients in runs of non-zero-valued coefficients in the first region. The method further includes coding the of runs of non-zero-valued coefficients using a runlength coding method of the third kind in the second, e.g., high-frequency region. The method further includes coding the amplitude values of the non-zero-valued coefficients in the second, region.

The invention takes into account the observed clustered nature of non-zero valued transform coefficients in the low frequency region and relatively more scattered nature of transform coefficients in the high frequency region by using different runlength coding methods in the low-frequency and high frequency regions. A single runlength code is used in the first region to encode the positions of runs of consecutive non-zero-valued coefficients. At most, five independent coding tables may be used: two runlength and a first amplitude table for low frequency coefficients and one runlength and a second amplitude table for the high frequency coefficients. The code lengths and code tables may then be shorter than that of typical 2D-VLC table.

Furthermore, when a relatively low breakpoint value is used, escape codes, common in 2D-VLC, may be avoided.

It should be noted that no overhead bits are needed to address the usage of the five independent tables.

Embodiments are presented as a method of encoding. Another embodiment is presented as a method of decoding. Yet another embodiment is presented as an apparatus for coding. Yet another embodiment is presented as an apparatus for decoding. Yet another embodiment is presented as a memory storing a data structure of codewords. Yet another embodiment is presented as a carrier medium carrying instructions to instruct a processor to carry out an encoding method.

One method embodiment is for processing an ordered series of digital signals that each have an amplitude from a finite set of amplitudes consisting of the most-likely-to-occur amplitude and at least one other amplitude. The processing is to reduce the amount of data used to represent the digital signals and to form codewords such that the more likely to occur sequences of values of digital signals are represented by relatively short codewords and the less likely to occur sequences of values of digital signals are represented by relatively long codewords.

The method includes for each run of consecutive signals of value or values other than the most-likely-to-occur value occurring in a first contiguous region defined by a breakpoint along the ordering of the series, encoding the runlength of the consecutive signals using a first runlength coding method, and forming a codeword that encodes the runlength using the first runlength coding method and further encodes the amplitudes and signs of each signals in the run, the breakpoint defining the first continuous region and a second contiguous region following the first contiguous region.

The method further includes for each run of consecutive signals of the most-likely-to-occur value occurring in the first region defined by the breakpoint, encoding the runlength of the consecutive signals of the most-likely-to-occur value using a second runlength coding method.

The method further includes encoding the signals occurring in the second region defined by the breakpoint, the encoding using a second-region coding method, the second-region coding method including: identifying events that include runs of consecutive signals of the most-likely-to-occur value in the second region and encoding said identified events in the second region using a third coding method.

The first, second, and third coding methods include variable length codes such that relatively short codewords are formed to represent sequences of values that are relatively more likely to occur, and relatively long codewords are formed to represent sequences of values that are relatively less likely to occur.

In one embodiment of the method, the series of digital signals is a series of quantized coefficients of a transformed block of image data, the transform such that the most-likely-to-occur amplitude is 0.

Other features, properties, and aspects will be clear from the drawings, description, and claims.

DETAILED DESCRIPTION

Described herein are a variable length coding method and an apparatus for coding transform domain coefficients as encountered in video coding. The coding method is expected to be at least as good as traditional 2D-VLC coding. It can potentially be used to replace existing 2D-VLC coding methods.

The present, invention relates to encoding an ordered series of digital signals that each have an amplitude from a finite set of amplitude values. Each signal may also have a sign, i.e., be either positive or negative). The set of amplitude values include one most-likely-to-occur amplitude and at least one other amplitude. The application discussed herein is for the ordered series of signals being the ordered set of quantized coefficient values of a block of image data after transformation by a transform such as the DCT or some other common transform, after quantization to a finite number of values, and after ordering along a predefined path, e.g., a zigzag path. The ordering of the series is typically in order of increasing spatial frequency. The most-likely-to-occur value, e.g., the most frequently occurring value is typically 0.

We have observed that there is an additional statistic that may have been overlooked in prior art variable length coding methods. Non-zero-valued quantized transform coefficients along the path tend to cluster more in the low frequency region and are more scattered in the high frequency region. That is, runs of non-zero values are more likely to occur in lower spatial frequencies than in higher spatial frequencies.

One aspect of the invention is that a breakpoint is used along the ordering of the series to define a first region, e.g., the region before the breakpoint, and a second region, e.g., the region after the breakpoint. Thus, for example, for an 8 by 8 block, there may be a breakpoint between 21 and 22, such that the first 21 coefficients in the ordered series are in the first region, and the last 43 coefficient starting with the 22nd coefficient in the ordered series are in the second region. The breakpoint itself may also be in the region. Thus, for example, for an 8 by 8 block, there may be a breakpoint at 22, such that the first 21 coefficients in the ordered series are in the first region, and the last 43 coefficient starting with the 22nd coefficient in the ordered series are in the second region. Furthermore, the breakpoint may define how the regions are formed, but may not correspond to the actual boundary between the first and second region. See below for a description of a soft vs. a hard boundary defined by the same breakpoint.

Another aspect of the invention is that a first coding method is used to encode data that occurs in the first region, while another method is used to encode data in the second region.

Yet another aspect of the invention is the selection of the breakpoint.

Yet another aspect of the invention is how the breakpoint is used. In one version, the breakpoint defines a hard boundary between the first and second region, so that, for example, a sequence of consecutive non-zero-valued coefficients that crosses the breakpoint is regarded as a first sequence up to the breakpoint, and a second sequence after the breakpoint. In another version, the breakpoint defines a boundary that is soft, so that any sequence of consecutive values, e.g., consecutive zero-values, or consecutive non-zero-values that starts prior to the breakpoint and crosses the breakpoint is regarded as a sequence that occurs in the first region. For such a block that includes such a sequence that crosses the breakpoint, the effective boundary starts after the end of the sequence, so that the effective boundary defined by a breakpoint may change from sequence to sequence.

For each run of non-zero valued coefficients—in general, for each run of coefficients having values other than the most-likely-to-occur value—one aspect of the invention encodes the runlength of the run using a first run length encoding method, and encodes the sequence of amplitudes in the run, including any signs. Each run of zero-valued coefficients—in general, each run of coefficients having the most-likely-to-occur value—is encoded using a second runlength coding method. Thus, two types of runlength codes are alternately used in the first region.

In one embodiment, the codewords for the coefficients in the first region start with a codeword of the first coding method and alternate between the first coding method and the second coding method. To provide for the case that the first run encountered is a run of zeroes, one of the codewords of the first coding method is a particular codeword to indicate that indeed the first run encountered is a run of zeroes such that a codewords of the second method follows the particular codeword of the first method.

In the second region, a third coding method is used to encode the remaining ordered series of coefficients.

Table 3 and Table 4 below respectively show two runlength code tables for runs of consecutive non-zero-valued coefficients and runs of consecutive zero-valued coefficients, respectively, where ci and c'i, respectively denote the codes for runs of i consecutive non-zero-valued coefficients and zero-valued coefficients, respectively, where i is the runlength: i=1, 2, . . . .

TABLE 3

| Run length | 1 | 2 | 3 | 4 | 5 | 6 | . |
|---|---|---|---|---|---|---|---|
| Code | c1 | c2 | C3 | c4 | c5 | c6 | . |

TABLE 4

| Run length | 1 | 2 | 3 | 4 | 5 | 6 | . |
|---|---|---|---|---|---|---|---|
| Code | c'1 | c'2 | C'3 | c'4 | c'5 | c'6 | . |

As an example, assuming the ordered series of quantized coefficients along the ordering path in the first frequency region starts with:

232-1012001-1100 . . .

To determine the runlengths, this series may be written as:

N N N N 0 N N 0 0 N N N 0 0 . . .

where N represents any non-zero-valued coefficient and 0 represents a zero-valued coefficient.

Denote by ri the run of i consecutive non-zero coefficients, and r'i the run of i consecutive zero-valued coefficients. The ordered sequence of the example then starts with:

r4 r'1 r2 r'2 r3 r'2 . . .

The result of encoding the runlengths but not amplitudes of this pattern can then be written as:

c4 c'1 c2 c'2 c3 c'2 . . .

To complete the first-region coding method, included with the codeword of each run of non-zero-valued coefficients are codewords for each amplitude in the run, and further bits for the sign of each coefficient for transforms whose coefficients can be positive or negative, e.g., the commonly used DCT transform. In one embodiment, the amplitudes are each encoded using a variable length code, and the signs are each encoded using a sign bit. Denote by $A_k$, k=1, 2, 3, . . . the variable length amplitude codes for amplitudes 1, 2, . . . respectively, denote by $S_+$ and $S_-$ the sign bit codes for positive and negative coefficients, respectively, and denote concatenation by +. The example sequence above is then encoded as follows:

(c4+A2+$S_+$+A3+$S_+$+A2+$S_+$+A1+$S_-$)+c'1+(c2+A1+$S_+$+ A2+$S_+$)+c'2+(c3+A1+$S_+$+A1+$S_-$+A1+$S_+$)+c'2 . . . .

In one embodiment, it is assumed that the series starts with a run of one or more non-zero-valued coefficients. Therefore, the first codeword is always a codeword from the coding method of the first kind. A code is included for when the series starts with a run of one or more zeros to indicate that the first code used is the code for runs of zeroes. In such an embodiment, the DC component is separately sent, such that the first coefficient in the first region is the first non-DC coefficient along the ordering.

Thus, for example, indicating by RP the codeword in the coding method of the first kind that indicates that the first region starts with a run of one or more zero-valued coefficients, suppose the series of coefficients in the first region starts with:

0232-1012001-1100 . . .

In one embodiment, the codewords for this first region part is:

RP+c'1+(c4+A2+$S_+$+A3+$S_+$+A2+$S_+$+A1+$S_-$)+c'1+(c2+ A1+$S_+$+A2+$S_+$)+c'2(c3+A1+$S_+$+A1+$S_-$+A1+$S_+$)+ c'2 . . . .

In another embodiment, a codeword is included in the coding method of the first kind that indicates that the series has no non-zero values. In another embodiment, such a codeword also is used to indicate that all remaining coefficients in the first region are zero. This codeword is called skip-to-boundary (SKP) herein.

In one embodiment, in the second region, a second-region coding method is used that takes into account the occurrence of runs of zero-valued coefficients. The second-region coding method includes identifying events that include runs of consecutive signals of the most-likely-to-occur value, e.g., zero-vale coefficients in the second region and encoding the identified events in the second region using a third coding method.

One embodiment of the second-region coding method includes identifying the runs of zero-valued coefficients and encoding the runlengths of each run of zero-valued coefficients using a third runlength coding method that provides a code for each run, such as a code represented by the runlength table shown in Table 5 below, where c"i, i=0, 1, 2, . . . represents the runlength code used to encode a runlength of i consecutive 0's

TABLE 5

| Run length | 0 | 1 | 2 | 3 | 4 | 5 | 6 | . |
|---|---|---|---|---|---|---|---|---|
| Code | c"0 | c"1 | c"2 | c"3 | c"4 | c"5 | c"6 | . |

One aspect of the invention is that an end code, denoted EOB herein, is used to indicate that the remaining coefficients in the second region are all zero.

As an example, suppose the ordered series quantized coefficients along the pre-determined path for the second region is:

0001001-100000100 . . . 0.

This series may be written as:

000N00NN00000N00 . . . 0 where N represents any non-zero-valued coefficient and 0 represents a zero-valued coefficient.

Denote by r"i the runs of i consecutive zero-valued coefficients, i=0, 1, 2, . . . In one embodiment, each non-zero valued coefficient in the series of the second region is assumed to be preceded by a run of zero-valued coefficients, so that the second of two consecutive non-zero-valued coefficients is preceded by a run of no zero-valued-coefficients (i=0). The above example ordered sequence of runs of zeroes in the second regions may then be written as:

r"3 r"2 r"0 r"5 EOB where EOB is used to indicate that the remaining coefficients are all 0, and in which it is understood that there is exactly one non-zero-valued coefficient between each run of 0's. Using the codes of Table 5 for the runlengths, the result of encoding the runs in the series of the second region is then:

c"3 c"2 c"0 c"5 EOB

If quantized coefficients along a specified path in the second region are of values greater or equal to one then in one embodiment, the encoding process includes a variable length amplitude code after the runlength code to encode the amplitude of the non-zero-valued coefficient, and a sign code for the non-zero-valued coefficient that follows the run of 0's. Denote by $A''_k$, k=1, 2, 3, . . . the variable length amplitude codes for amplitudes 1, 2, . . . respectively, denote by $S_+$ and $S_-$ the sign bit codes for positive and negative coefficients, respectively, and denote concatenation by +. The above example sequence of the second region is then encoded as follows:

(c"3+A"i+S)+(c"2+A"i+$S_+$)+(c"0+A"i+S−)+(c"5+A"i+ $S_+$)+$_{EOB}$.

Note that in one embodiment, the amplitude coding method (the A"i values, i=1, 2, . . . ) for quantized coefficient amplitudes that occur in the second region is different from the amplitude coding (the Ai values, i=1, 2, . . . ) for quantized coefficient amplitudes that occur in the first region. It is expected, for example, that the amplitudes in the second region, e.g., the high-frequency region, would be dominated by lower values than the amplitudes that occur in the first region, e.g., the low frequency region, for typical images.

Alternate methods for encoding the coefficients in the second region are described below.

The Breakpoint Defining the Two Regions

One version uses a fixed breakpoint between the first, e.g., low frequency region, and the second, e.g., high frequency region. In one embodiment, the fixed breakpoint is pre-determined for each type of image and for each type of compression method by running experiments collecting statistics on a set of typical samples such images. Typically, different breakpoints are determined for:

- intraframe and still image coding vs. interframe coding;
- standard definition television images (SDTV) vs. HDTV images;
- high bit rate coding methods vs. low bit rate coding methods;
- DCT vs. non-DCT transforms;

and so forth.

When fixed breakpoints are used, there is already an indication passed on to the decoder to indicate the type of image, e.g., whether interframe or intraframe. Thus, there is typically no need to send a further indication to the decoder of the breakpoint.

The inventors performed experiments on typical still images—applicable also to intraframe images in motion coding—by performing variable length coding according to embodiments of the present invention, and plotting the size of the compressed image for different breakpoint values for the case of 8 by 8 blocks quantized to 32 non-zero amplitudes using the DCT, and observed that a breakpoint of 22 worked for most images, although some images worked well with a breakpoint of about 10. Therefore, in one embodiment for intraframe and still images for DCT transform coding, a pre-selected fixed breakpoint of 22 was used.

In a first variation, the breakpoint is image dependent and selected from a finite set according to a breakpoint selection criterion. For example, from the above-described experiments, the compression using a first breakpoint of 22 was compared to the compression using a second breakpoint of 10, and the breakpoint that gave the higher compression used. Other breakpoint selection criteria also are possible, e.g., by looking at the statistics of runs of zero-valued coefficients and non-zero-valued coefficients.

When such an image-dependent breakpoint is used, an indication of the breakpoint is also sent with each set of coefficients. In one embodiment, a 2-bit indication is sent. This provides for each block to be encoded using one of 4 pre-defined breakpoints. In an alternate embodiment, the indication of which pre-defined breakpoint is sent as a variable length code such that more common breakpoints are encoded by a shorter code.

While typically, the set of possible breakpoints is a small subset of the possible positions in the series, in yet another variation, the image dependent breakpoint is selected from anywhere in the series, on, in an alternate variation, from anywhere along a subrange.

In yet another variation, instead of the breakpoint defining a fixed boundary between the first and second region, called a "hard" boundary herein, or a set of breakpoints defining a set of hard breakpoints, such that a sequence of consecutive non-zero values, or a sequence of consecutive zero-valued coefficients that crossed the breakpoint would be regarded as a first sequence in the first region up to the breakpoint, and a second sequence in the second region, the breakpoint defines what is called herein a "soft" boundary in that any sequence of consecutive zero, or non-zero values that started in the first region would be encoded in the first region even if it crossed the breakpoint. Thus, the actual boundary for a particular block of coefficients might extend beyond the breakpoint. For example, consider the following ordered series of digital signals of coefficients:

232-1-1111-11012001-1100 . . .

And suppose a breakpoint of up to and including 7 is used.

In one embodiment, the breakpoint forms a hard boundary. In such a case, the first region is:

232-1-111 and the second region is:

1-1012001-1100 . . .

So that the coding of the first region is:

$c7+A2+S_++A3+S_++A2+S_++A1+S_-+A1+S_-+A1+S_++A1+S_+$ and the coding of the second region is:

$c"0+(A"1+S_+)+c"0+(A"1+S_-)+c"1+(A"1+S_+)+c"0+(A"2+S_+)+c"2+(A"1+S_+)+c"0+(A"1+S_-)+c"0+(A"1+S_+)$ . . .

In another embodiment, the breakpoint defines a soft boundary. In such a case, for this particular block, the first region is:

232-1-1111-1 and the second region is:

012001-1100 . . .

So that the coding of the first region is:

$c9+A2+S_++A3+S_++A2+S_++A1+S_-+A1+S_-+A1+S_++A1+S_++A1+S_++A1+S_-$ and the coding of the second region is:

$c"1+(A"1+S_+)+c"0+(A"2+S_+)+c"2+(A"1+S_+)+c"0+(A"1+S_-)+c"0+(A"1+S_+)++c"2+$ . . .

That is, for the second embodiment, the breakpoint of 7 corresponds to a boundary of 9 for this particular block.

Alternate Codes for the Second Region

The coding method used in the second region includes identifying events that include a run of zero-valued coefficients, and encoding the event using the third coding method. One embodiment above uses a third runlength coding method to separately encode the runs of zero-valued coefficients in the series in the second region, and then additionally encodes the values of the amplitudes. In an alternate embodiment, traditional 2D-VLC is used to identify events that include a run of zero-valued coefficients with a single non-zero-valued coefficient and encode such events using 2D-VLC, e.g., using the 2D coding table such as Table 2 above derived using statistics, e.g., in the form of Table 1, of amplitudes and runs of preceding zeroes in the second region. In yet another embodiment, the 2D-VLC table is truncated in that long runs and/or large amplitudes following a run of zeroes use fixed length rather than variable length codes. In one such version, an escape code followed by a fixed code for the runlength of preceding zero-valued coefficients, followed by a fixed code for the amplitude and sign is used in place of the variable length code in a complete variable length code.

Other variations also are possible. For example, a variation sometimes called three-dimensional VLC (3D-VLC) may be used. See PCT patent publication WO 9318616 published Sep. 16, 1993 titled PICTURE DATA ENCODING METHOD. In 3D-VLC, each symbol ("event") is a triplet that includes a binary input flag that indicates whether or not the current non-zero amplitude-value is the last non-zero coefficient in the block.

Sample Code Tables: The Runlength Codes

The runlength codes for the coding methods of the first kind, the second kind, and the third kind for runlengths can be arithmetic codes or Huffman variable length codes. Different types of images may be examined experimentally and statistics collected for such images on the different runlengths to be encoded. The codes can then be assigned based on such statistics.

Table 6 below shows one embodiment of the codes according to the coding method of the first kind for runs of non-zero-valued coefficients that occur in the first region for still images and for intraframe images. This table assumes a breakpoint at 11 (excluding the DC coefficient) so that only 11 consecutive non-zero values are included. Note that the table includes a particular code for an event called RP that indicates that the table starts with a run of one or more zero-valued coefficients rather than a non-zero-valued coefficient. Note further that Table 6 assumes, as is common with many tables, that the DC component (the first entry) of the series is encoded separately, as is common in many VLC methods. Therefore, implied is that the first, element is the first non-DC value.

TABLE 6

Codes for runs of non-zeroes in first region

| Custer Pattern | Huffman Code | Code Length |
|---|---|---|
| N | 0 | 1 |
| NN | 100 | 3 |
| NNN | 1010 | 4 |
| NNNN | 10111 | 5 |
| NNNNN | 110111 | 6 |
| NNNNNN | 1011001 | 7 |
| NNNNNNN | 10110000 | 8 |
| NNNNNNNN | 110101010 | 9 |
| NNNNNNNNN | 10110001 | 8 |
| NNNNNNNNNN | 1101010111 | 10 |
| NNNNNNNNNNN | 1101010110 | 10 |
| skip_MB | 1100 | 4 (block that has no info) |
| RP | 111 | 3 (use R' from now on) |

In tables where the breakpoint can be more that 11, e.g., a breakpoint of 22, and for tables for the case of the breakpoint being what we call a "soft" breakpoint such that runs that extend beyond the breakpoint are allowed, in one embodiment, the first coding method uses a unique escape code denoted ESC1 herein, followed by a fixed length code for the length of the run, e.g., 5 bits for accommodating runs of up to 32 consecutive non-zero values, or 6-bits for accommodating runs of up to 64 consecutive non-zero values. Using 6 bits for the ESC1 code, the codewords for the length of the runs of non-zero coefficients in the first region are at most 11-bits long or 12-bits long, for using 5-bits and 6-bit codes, respectively, for the length of the codes.

Table 7 below shows one embodiment of the codes according to the coding method of the second kind for runs of zeroes that occur in the first region for still images and for intraframe images. Again, the breakpoint is assumed to be a fixed breakpoint of 11.

As in the case for the tables corresponding to the coding method of the first kind, in tables where the breakpoint can be more that 11, e.g., a breakpoint of 22, and for tables that accommodate a "soft" breakpoint such that runs that extend beyond the breakpoint are allowed, in one embodiment, the second coding method uses a unique escape code denoted ESC2 herein, followed by a fixed length code for the length of the run, e.g., 5 bits for accommodating runs of up to 32 consecutive zero values, or 6-bits for accommodating runs of up to 64 consecutive non-zero values.

TABLE 7

Code for runs of zeroes in first region

| Cluster Pattern | Huffman Code | Code_length |
|---|---|---|
| 0 | 0 | 1 |
| 00 | 101 | 3 |
| 000 | 1001 | 4 |
| 0000 | 10001 | 5 |
| 00000 | 100001 | 6 |
| 000000 | 1000001 | 7 |
| 0000000 | 10000001 | 8 |
| 00000000 | 100000001 | 9 |
| 000000000 | 1000000001 | 10 |
| 0000000000 | 10000000001 | 11 |
| 00000000000 | 10000000000 | 11 |
| EOB | 111 | 3 |

Note that Table 7 includes an EOB code to indicate that the remainder of the series consists of only zeroes.

Table 8 below shows one embodiment of a code table according to the coding method of the kind applicable to runs of zero-amplitude coefficients that occur in the second region for still images and for intraframe images.

TABLE 8

Codes for runs of zeroes in second region

| Runlength | Code | Code Length |
|---|---|---|
| 0 | 111 | 3 |
| 1 | 101 | 3 |
| 2 | 1001 | 4 |
| 3 | 1100 | 4 |
| 4 | 0101 | 4 |
| 5 | 0100 | 4 |
| 6 | 100011 | 6 |
| 7 | 1000101 | 7 |
| 8 | 10000010 | 8 |
| 9 | 100010010 | 9 |
| 10 | 10000000 | 8 |
| 11 | 10000001 | 8 |
| 12 | 1000100110 | 10 |
| 13 | 1000001100 | 10 |
| 14 or more | ESC3 + 6-bit length | 12 |
| EOB | 00 | 2 | where ESC3 is an escape code to indicate that what follows is a 6-bit code for the runlength for runs that are more than 13 long. In one embodiment, ESC3 is a 6-bit code, and 6-bits are used after the ESC3 code to encode the run-length of zeroes. Thus, no code is ever longer than 12 bits.

Sample Code Tables: The Amplitude Codes

In one embodiment, the two amplitude codes $A_i$, i=1, 2, ... and $A''_i$, i=1, 2, ... are each codes that are determined experimentally for a set of typical images by determining statistics for the non-zero amplitudes that occur in the first and the second regions. One embodiment of each of the amplitude tables of the first and second regions, respectively, is shown below as Table 9 and Table 10, respectively. Each of these tables was determined using a typical still image. Each table includes the amplitude (as a symbol), the codeword for that amplitude, and the length of the codeword. Also shown are the frequency of occurrence and the total number of bits for a typical still image.

In Table 9, amplitudes of 16 or higher are encoded by a 6-bit escape code plus 7 bits for the amplitude and sign. An alternate embodiment uses a coding table with 63 entries that concurrently encodes the sign and amplitude.

In Table 10, there is almost no likelihood of an amplitude greater than 16 in the second region, so that no codes are included for such higher amplitudes. In an alternate embodiment, relatively long codes are included for amplitudes greater than 16 that can occur in pathological cases.

TABLE 9

Amplitude codes in first region

| Amplitude | Code | Code Len | Freq |
|---|---|---|---|
| 1 | 1 | 1 | 94552 |
| 2 | 00 | 2 | 16222 |
| 3 | 0111 | 4 | 7489 |
| 4 | 0100 | 4 | 3965 |
| 5 | 01011 | 5 | 2701 |
| 6 | 011011 | 6 | 1731 |
| 7 | 011000 | 6 | 1262 |
| 8 | 010100 | 6 | 843 |
| 9 | 0110010 | 7 | 613 |
| 10 | 0101010 | 7 | 515 |
| 11 | 01100111 | 8 | 442 |
| 12 | 01010111 | 8 | 322 |
| 13 | 01010110 | 8 | 268 |
| 14 | 011001101 | 9 | 221 |
| 15 | 011001100 | 9 | 179 |
| 16 or more | 011010+Ampl. | 6 | 1463 |
| Total Bit Count | | | 237863 |

TABLE 10

Amplitude codes in second region

| Amplitude | Code | Code Len | Freq |
|---|---|---|---|
| 1 | 1 | 1 | 16297 |
| 2 | 01 | 2 | 1897 |
| 3 | 000 | 3 | 565 |
| 4 | 0010 | 4 | 271 |
| 5 | 00110 | 5 | 141 |
| 6 | 001110 | 6 | 77 |
| 7 | 0011110 | 7 | 45 |
| 8 | 001111111 | 9 | 24 |
| 9 | 001111100 | 9 | 15 |
| 10 | 0011111100 | 10 | 10 |
| 12 | 00111110111 | 11 | 5 |
| 13 | 00111111010 | 11 | 5 |
| 14 | 001111110110 | 12 | 2 |
| 15 | 001111110111 | 12 | 3 |
| 16 | 00111110110 | 11 | 3 |
| Total Bit Count | | | 25086 |

Multiple Breakpoints and More Than Two Regions

The above embodiments are in terms of a single breakpoint, and two regions in the ordering. The idea may be extended to more than two regions, i.e., more than one breakpoint. For example, one embodiment includes a first, low frequency region where there may reasonably likely be runs of zero-valued coefficients and runs of non-zero coefficients of value or more, a second, mid-frequency region where there may reasonably likely be runs of zero-valued coefficients, and runs of coefficients of value one, but where there is not likely to be runs of coefficients greater than one, and a third high-frequency region where there may reasonably likely be runs of zero-valued coefficients, but not many runs of non-zero-valued coefficients. Thus, one alternate run length coding method includes using two breakpoints to define a first, second, and third region. In the first region, runs of non-zero-valued coefficients and runs of zero-valued coefficients are identified, and the runlengths of the amplitude-one and zero-amplitude coefficients are encoded using a first runlength coding method and a second runlength coding method. In the second region, runs of coefficients of amplitude-one, and runs of zero-valued coefficients are identified, and the runlengths of the amplitude-one and zero-amplitude coefficients are encoded using a third runlength coding method and a fourth runlength coding method, respectively. In the third region, runs of zero-valued coefficients are identified, and the runlengths of such zero-valued-runs are encoded using a fifth runlength coding method.

Apparatus

Another aspect of the invention is an apparatus for coding a series of digital signals, e.g., an ordered series of quantized coefficients of a transformed block of image data.

Figure 3:
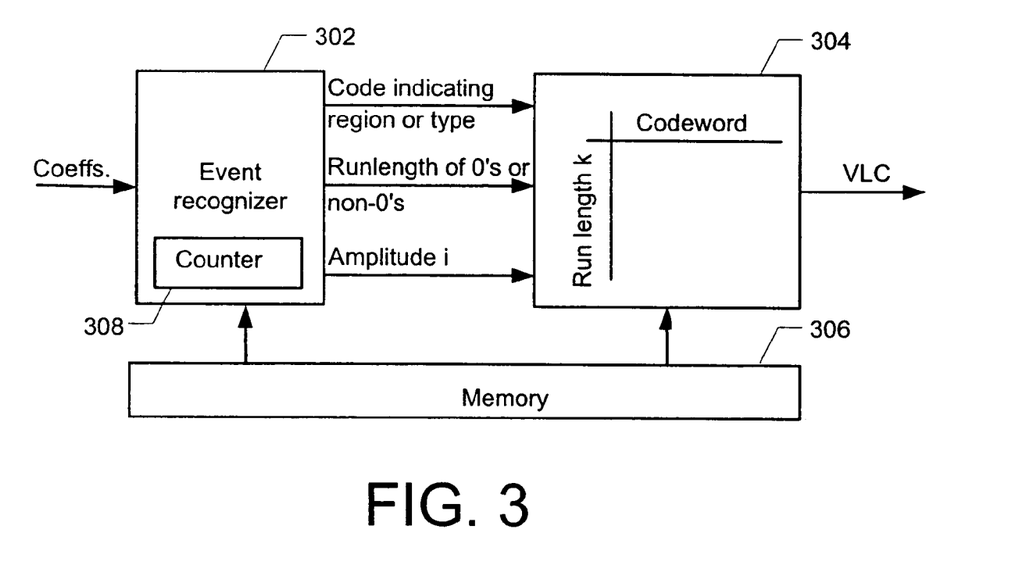
FIG. 3 shows a simplified block diagram of one embodiment of an apparatus to code a series of quantized transform coefficients.

FIG. 3 shows one embodiment of an apparatus for encoding according to the VLC tables described above. One embodiment uses three lookup tables such as Tables 6, 7, and 8 above that are stored in a memory 306. A counter 308 in an event recognizer 302 counts the coefficient number in the order of the series, and thus provides for the event recognizer 302 whether or not an event is in the first or the second region by determining whether or not the coefficient is before or after the breakpoint, also stored in the memory 306. The event recognizer 302 determines the runlength of consecutive zero amplitude coefficients, and the runlength of consecutive zero-length amplitudes when in the first region, and the runlength of zero amplitude coefficients when in the second region. For the first region, the runlength of zeroes (zeroes or non-zero) are passed together with the amplitudes (0 or non-zero). In one embodiment, a code is further passed to indicate when the values are in the second region. These output(s) of the event recognizer 302 are input to an encoder 304 that in one embodiment includes a lookup device to look up the appropriate one of the five code tables used.

While the embodiment shown in FIG. 3 has the memory 306 that stores the lookup tables separate from the lookup device, in another embodiment, the lookup device includes a memory for storing the code tables.

An alternate embodiment of FIG. 3 includes in the code generated by the event recognizer 302 an indication of whether or not the coefficient is the last coefficient in the block. This provides for an extension similar to that of traditional 3-D VLC as described in above-mentioned PCT patent publication WO 9318616.

Figure 4:
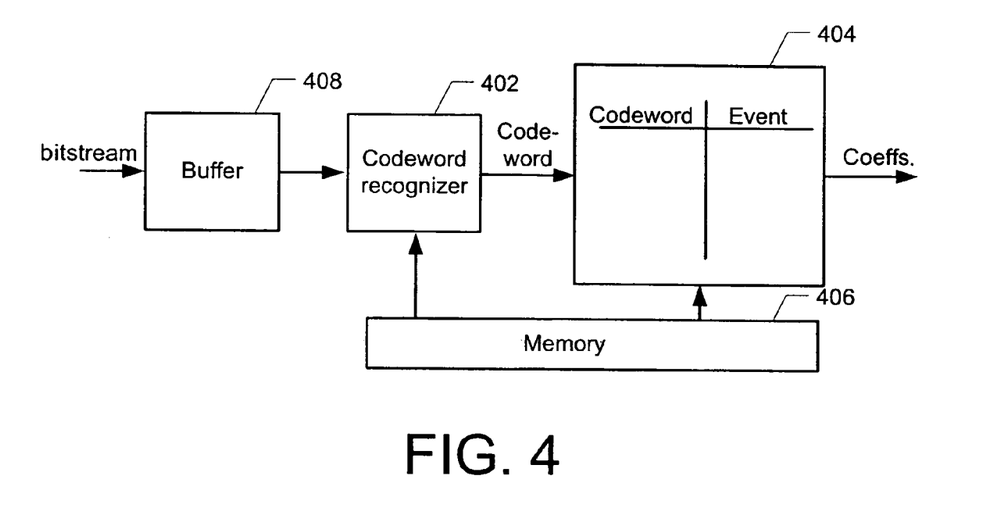
FIG. 4 shows a decoding apparatus according to an embodiment of the invention.

Another aspect of the invention is an apparatus for decoding a bitstream encoded by any of the novel methods described herein. FIG. 4 shows one embodiment of the apparatus. A codeword recognizer 402 accepts the bits of a bitstream and recognizes a codeword of a set of possible codewords that each represents an event. The codeword recognizer determines which of the five coding tables the codeword is from. A decoder 404 is coupled to the codeword recognizer 402 and determines the data for the codeword recognized by the codeword recognizer, e.g., the runlength of non-zeroes, the runlength of zeroes, the sign, etc. In one embodiment, the decoder 404 includes a lookup device that looks up the appropriate decoding table stored in a memory 406. That table provides the event for at least some of the codewords of the set of codewords. Other codewords may include an escape code, so that decoding is by other than a table lookup method. In one embodiment, the bitstream is stored in a buffer 408, and the output of the buffer is coupled to the codeword recognizer.

While in the embodiment shown in FIG. 4, the memory is shown separate from the lookup device, those in the art will understand that in other embodiments, the lookup device includes memory for the tables, and such other embodiments are included herein.

Note that in FIG. 3, the event recognizer and also the lookup device may be each implemented on a computer as a set of instructions stored in a memory, e.g., the memory 306, that instruct one or more processors to carry out the operations of the recognition and of the lookup.

Note further that in FIG. 4, the codeword recognizer and also the lookup device may be each implemented on a computer as a set of instructions stored in a memory, e.g., the memory 406, that instruct one or more processors to carry out the operations of the recognition and of the lookup.

Another aspect of the invention is a memory (such as memory 306 in FIG. 3) that stores a coding data structures that provides the codewords for sets of one or more coefficients as described any one of the novel coding methods described herein. In one embodiment, the data structure is in the form of one or more tables.

Another aspect of the invention is a memory (such as memory 406 in FIG. 4) that stores a decoding data structure that provides the data for any set of codewords recognized in a bitstream of compressed image data. The bitstream is coded by any one of the novel coding methods described herein. In one embodiment, the data structure is in the form of one or more tables.

Thus, variable length coding method has been described suitable for encoding the quantized transform coefficients of blocks of images as occur in common image compression methods.

One embodiment of the present invention uses five independent tables: two runlength code tables for the coding methods of the first and second kinds, and a first amplitude code table for use in the first region, and another runlength code table for the coding method of the third kind, and a second amplitude code table for use in the second region.

One embodiment of each of the methods described herein is in the form of a computer program that executes on a processing system, e.g., a one or more processors that are part of an image coder or decoder, as appropriate. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

It should further be appreciated that although the invention has been described in the context of transform encoding of images, the invention is not limited to such contexts and may be utilized in various other compression applications and systems. Furthermore, the invention is not limited to any one type of architecture or type of transform encoding. For example, the DCT is mentioned above as one transform. Other transforms may be used, e.g., the new H.264/MEG-4 AVC video coding standard/draft standard defines 4×4 blocks and a DCT-like 4×4 integer transform. The invention does not depend on any particular type of interframe coding if used, or of motion compensation if used for interframe coding, or any intra-estimation if used for estimating the pixels of a block using information from neighboring blocks.

Note that variable length coding is sometimes referred to as entropy coding or statistical coding.

Note that in some of the above examples for amplitude encoding, 63 possible non-zero values are assumed for the coefficients, the invention is not restricted to any number of possible quantization values.

Note also that the term amplitude is irrespective of sign. Therefore, for example, coefficient of values +1 and −1 both have amplitude 1.

In the embodiments described above, the forming of the codeword includes an indication of the sign of any non-zero coefficients. In one version, the sign information for any runs of non-zero amplitudes in the first region is added together with the information of each amplitude. In an alternate embodiment, the sign information for any runs of non-zero amplitudes in the first region may be included in a different manner, e.g., as a code for the series of signs. Other alternate embodiments are also possible for encoding the sign.

While one embodiment described herein includes a memory that stores coding tables, other embodiments store the coding information in the form of a data structure other than a table, e.g., a structure that includes a tree. Other data structures may also be used. Similarly, while one embodiment described herein includes a memory that stores a decoding, other embodiments store the decoding information in the form of a data structure other than a table for the decoding.

Note also that the present invention does not depend on the particular type of VLC used for any of the coding methods, e.g., the coding tables, and can work, for example, with Huffman coding and with arithmetic coding methods. Furthermore, while embodiments have been described that used fixed encoding for the events based on assumed or a priori likelihoods of occurrence of the events (also called the symbols), i.e., the likelihoods of occurrence of the events do not change, other embodiments use adaptive encoding, i.e., the encoding is changeable according to statistical data such as histograms collected from the actual coefficients.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method for processing an ordered series of digital signals that each have an amplitude from a finite set of amplitudes consisting of the most-likely-to-occur amplitude and at least one other amplitude, the processing to reduce the amount of data used to represent the digital signals and to form codewords such that the more likely to occur sequences of values of digital signals are represented by relatively short codewords and the less likely to occur sequences of values of digital signals are represented by relatively long codewords, the method comprising:

for each run of consecutive signals of value or values other than the most-likely-to-occur value occurring in a first contiguous region defined by a breakpoint along the ordering of the series, encoding the runlength of the consecutive signals using a first runlength coding method, and forming a codeword that encodes the runlength using the first runlength coding method and further encodes the amplitudes and signs of each signals in the run, the breakpoint defining the first continuous region and a second contiguous region following the first contiguous region;

for each run of consecutive signals of the most-likely-to-occur value occurring in the first region defined by the breakpoint, encoding the runlength of the consecutive signals of the most-likely-to-occur value using a second runlength coding method; and encoding the signals occurring in the second region defined by the breakpoint, the encoding using a second-region coding method, the second-region coding method including identifying events that include runs of consecutive signals of the most-likely-to-occur value in the second region and encoding said identified events in the second region using a third coding method, wherein the first, second, and third coding methods include variable length codes such that relatively short codewords are formed to represent sequences of values that are relatively more likely to occur, and relatively long codewords are formed to represent sequences of values that are relatively less likely to occur, and wherein the breakpoint value is selected from a finite set of pre-defined breakpoint values according to which of the breakpoints of the set produces the shortest number of bits, or the breakpoint defines a soft boundary between the first and second regions, such that for a block having a sequence of consecutive values all having the most-likely-to-occur value or all having other than the most-likely-to-occur value crosses the breakpoint, the boundary between the first and second region is at or after the end of the sequence such that the whole sequence or any event that starts in the first region is in the first region.

2. A method as recited in claim 1,
wherein the series of digital signals is a series of quantized coefficients of a transformed block of image data, the transform such that the most-likely-to-occur amplitude is 0.

3. A method as recited in claim 2, wherein the series is divided into more than two regions by the breakpoint and an additional breakpoint for each region in addition to the second region, the method further comprising:

encoding the signals occurring in each additional regions defined by the corresponding additional breakpoint, the encoding using a coding method different from the coding methods used in other regions.

4. A method as recited in claim 2,
wherein the third coding method includes encoding runlengths of consecutive zero-valued coefficients using a third variable length runlength coding method, and encoding the amplitudes and signs of the non-zero-valued coefficients.

5. A method as recited in claim 2, wherein the breakpoint defines a soft boundary and has a pre-selected value.

6. A method as recited in claim 5, wherein the method is applicable to intraframe image data and to interframe blocks of image data, and wherein a first pre-selected breakpoint value is used for intraframe image data and a second first pre-selected breakpoint value is used for interframe image data.

7. A method as recited in claim 1, wherein the breakpoint defines a hard boundary between the first and second regions.

8. A method as recited in claim 2, wherein the breakpoint defines the soft boundary between the first and second regions, such that for a block having a sequence of consecutive non-zero values or consecutive zero values that crosses the breakpoint, the boundary between the first and second region is at or after the end of the sequence such that the whole sequence or any event that starts in the first region is in the first region.

9. A method as recited in claim 2, further comprising the step of:

forming fixed length codewords for at least some of the runlengths.

10. A method as recited in claim 9, wherein the first runlength coding method includes forming fixed length codewords for at least some of the runlengths in the first region.

11. A method as recited in claim 9, wherein the second runlength coding method includes forming fixed length codewords for at least some of the runlengths in the first region.

12. A method as recited in claim 9, wherein the third coding method includes forming fixed length codewords for at least some of the runlengths in the second region.

13. A method as recited in claim 9, wherein the runlengths for which the fixed codewords are formed are less likely to occur than the runlengths for which a variable length codeword is used, and wherein the fixed length codewords are at least as long as any variable length codeword.

14. A method as recited in claim 9, wherein each fixed length codeword includes an escape code.

15. A method as recited in claim 2, wherein the first coding method includes a codeword for the runlength of non-zero-values coefficients, and a set of codewords for the amplitudes and signs of the non-zero-valued coefficients in each run.

16. A method as recited in claim 2, wherein the codewords for the coefficients in the first region start with a codeword of the first coding method and alternate between the first coding method and the second coding method, and wherein one of the codewords of the first coding method is a particular codeword to indicate that the first run encountered is a run of zeroes such that a codeword of the second method follows the particular codeword of the first method.

17. A method as recited in claim 2,
wherein the third coding method includes a codeword for the runlength of zero-values coefficients, and a codeword to indicate no zero-values coefficients between two non-zero-values coefficients, and
wherein codewords also are generated for the amplitudes and signs of each of the non-zero-valued coefficients in the second region.

18. A method as recited in claim 17, wherein the third coding method includes a two-dimensional variable-length coding method that encodes events consisting of a run of consecutive zero-valued coefficients followed by a single non-zero-valued coefficient.

19. A method as recited in claim 2,
wherein a first runlength code table, a second runlength code table, and a first amplitude code table are provided for coding information in the first region,
wherein the first runlength code table is for storing a plurality of codewords for a set of runlengths of non-zero valued coefficients, the first table organized such that the more likely-to-occur runlengths have shorter codewords than the less likely-to-occur runlengths,
wherein the second runlength code table is for storing a plurality of codewords for a set of runlengths of zero valued coefficients, the second table organized such that the more likely-to-occur runlengths have shorter codewords than the less likely-to-occur runlengths,
wherein the first amplitude code table is for storing a plurality of codewords for the amplitudes of the coefficients in each runlength of non-zero-valued coefficients,
wherein the step of forming a codeword for each runlength of non-zero valued coefficients includes looking up the first runlength code table, and further includes looking up the first amplitude code table for each non-zero coefficient in the runlength of non-zero coefficients, and
wherein the step of forming a codeword for each runlength of zero valued coefficients in the first region includes looking up the second runlength code table.

20. A method as recited in claim 19,
wherein a third runlength code table and a second amplitude code table are provided for coding information in the second region,
wherein the third runlength code table is for storing a plurality of codewords for a set of runlengths of zero valued coefficients that occur in the second region, the third table organized such that the more likely-to-occur runlengths have shorter codewords than the less likely-to-occur runlengths,
wherein the second amplitude code table is for storing a plurality of codewords for the amplitudes of non-zero coefficients that occur in the second region, and
wherein the step of forming a codeword for each runlength of zero valued coefficients in the second region includes looking up the third runlength code table.

21. A method as recited in claim 2, wherein the forming of codewords for each runlength is fixed based on assumed a priori likelihood of occurrence of the events.

22. A method as recited in claim 2, wherein the forming of codewords for each event is changeable according to actual statistical data collected from the series of digital values.

23. A method as recited in claim 2, further comprising:
forming an indication for when all the remaining digital signals in the second region of the series have the zero amplitude.

24. A method of image compression comprising:
dividing an image into blocks; and
for each block:
transforming the block to form transform coefficients for the block;
quantizing the transform coefficients of the block;
ordering the quantized coefficients of the block along a two-dimensional path to form an ordered series of quantized transform coefficients;
forming events from the series of quantized transform coefficients, each event being a run of non-zero-valued coefficients in a first contiguous region defined by a breakpoint, a run of zero-valued coefficients in the first region, or a run of zero-valued coefficients in a second region defined by the breakpoint, the breakpoint defining the first region and a second continuous region in the series following the first region;
forming a codeword for each runlength of non-zero-valued coefficients in the first region, the forming a codeword according to a first coding method;
forming a codeword for each runlength of zero-valued coefficients in the first region, the forming a codeword according to a second coding method; and
encoding the coefficient values in the second region according to a third coding method, the third coding method including identifying runs of zero-valued coefficients in the second region,
such that relatively short codewords are formed to represent runlengths that are relatively more likely to occur, and relatively long codewords are formed to represent runlengths that are relatively less likely to occur, and
wherein the breakpoint value is selected from a finite set of pre-defined breakpoint values according to which of the breakpoints of the set produces the shortest number of bits, or the breakpoint defines a soft boundary between the first and second regions, such that for a block having a sequence of consecutive values all being zero or all being non-zero crosses the breakpoint, the boundary between the first and second region is at or after the end of the sequence such that the whole sequence or any event that starts in the first region is in the first region.

25. A method as recited in claim 24,
wherein the third coding method includes encoding runlengths of consecutive zero-valued coefficients using a third variable length runlength coding method, and encoding the amplitudes and signs of the non-zero-valued coefficients.

26. A method as recited in claim 24, wherein the breakpoint defines a soft boundary and has a pre-selected value.

27. A method as recited in claim 26, wherein the method is applicable to intraframe image data and to interframe blocks of image data, and wherein a first pre-selected breakpoint value is used for intraframe image data and a second first pre-selected breakpoint value is used for interframe image data.

28. A method as recited in claim 24, wherein the breakpoint defines a hard boundary between the first and second regions.

29. A method as recited in claim 24, wherein the breakpoint defines only the soft boundary between the first and second regions, such that for a block having a sequence of consecutive non-zero values or consecutive zero values that crosses the breakpoint, the boundary between the first and second region is at or after the end of the sequence such that the whole sequence or any event that starts in the first region is in the first region.

30. A method as recited in claim 24, further comprising the step of:
forming fixed length codewords for at least some of the runlengths.

31. A method as recited in claim 30, wherein the first runlength coding method includes forming fixed length codewords for at least some of the runlengths in the first region.

32. A method as recited in claim 30, wherein the second coding method includes forming fixed length codewords for at least some of the runlengths in the first region.

33. A method as recited in claim 30, wherein the third coding method includes forming fixed length codewords for at least some of the runlengths in the second region.

34. A method as recited in claim 30, wherein the runlengths for which the fixed codewords are formed are less likely to occur than the runlengths for which a variable length codeword is used, and wherein the fixed length codewords are at least as long as any variable length codeword.

35. A method as recited in claim 30, wherein each fixed length codeword includes an escape code.

36. A method as recited in claim 24, wherein the first coding method includes a codeword for the runlength of non-zero-values coefficients, and a set of codewords for the amplitudes and signs of the non-zero-valued coefficients in each run.

37. A method as recited in claim 24, wherein the codewords for the coefficients in the first region start with a codeword of the first coding method and alternate between the first coding method and the second coding method, and wherein one of the codewords of the first coding method is a particular codeword to indicate that the first run encountered is a run of zeroes such that a codeword of the second method follows the particular codeword of the first method.

38. A method as recited in claim 24,
wherein the third coding method includes a codeword for the runlength of zero-value coefficients, and a codeword to indicate no zero-value coefficients between two non-zero-value coefficients, and
wherein codewords also are generated for the amplitudes and signs of each of the non-zero-valued coefficients in the second region.

39. A method as recited in claim 38, wherein the third coding method includes a two-dimensional variable-length coding method that encodes events consisting of a run of consecutive zero-valued coefficients followed by a single non-zero-valued coefficient.

40. A method as recited in claim 24,
wherein a first runlength code table, a second runlength code table, and a first amplitude code table are provided for coding information in the first region,
wherein the first runlength code table is for storing a plurality of codewords for a set of runlengths of non-zero valued coefficients, the first table organized such that the more likely-to-occur runlengths have shorter codewords than the less likely-to-occur runlengths,
wherein the second runlength code table is for storing a plurality of codewords for a set of runlengths of zero valued coefficients, the second table organized such that the more likely-to-occur runlengths have shorter codewords than the less likely-to-occur runlengths,
wherein the first amplitude code table is for storing a plurality of codewords for the amplitudes of the coefficients in each runlength of non-zero-valued coefficients,
wherein the step of forming a codeword for each runlength of non-zero valued coefficients includes looking up the first runlength code table, and further includes looking up the first amplitude code table for each non-zero coefficient in the runlength of non-zero coefficients, and
wherein the step of forming a codeword for each runlength of zero valued coefficients in the first region includes looking up the second runlength code table.

41. A method as recited in claim 40, wherein
wherein a third runlength code table and a second amplitude code table are provided for coding information in the second region,
wherein the third runlength code table is for storing a plurality of codewords for a set of runlengths of zero valued coefficients that occur in the second region, the third table organized such that the more likely-to-occur runlengths have shorter codewords than the less likely-to-occur runlengths,
wherein the second amplitude code table is for storing a plurality of codewords for the amplitudes of non-zero coefficients that occur in the second region, and
wherein the step of forming a codeword for each runlength of zero valued coefficients in the second region includes looking up the third runlength code table.

42. A method as recited in claim 24, wherein the forming of codewords for each runlength is fixed based on assumed a priori likelihood of occurrence of the events.

43. A method as recited in claim 24, wherein the forming of codewords for each event is changeable according to actual statistical data collected from the series of digital values.

44. A method as recited in claim 24, further comprising:
forming an indication for when all the remaining digital signals in the second region of the series have the zero amplitude.

45. An apparatus to encode an ordered series of quantized coefficients of a transform of a block of image data, the transform such that 0 is the most likely coefficient amplitude and 1 is the next most likely coefficient amplitude, the apparatus comprising:
means for forming non-zero-amplitude events in a first contiguous region of the series of quantized transform coefficients, the first region defined by a breakpoint defining a first and a second contiguous regions region following the first region, each non-zero-amplitude event defined by the runlength of a run of non-zero-valued coefficients and by the values of the non-zero coefficients;
means for forming zero-amplitude events in the first region of the series of quantized transform coefficients, each zero-amplitude event defined by the runlength of zero-valued coefficients;
means for forming a codeword for each formed non-zero-amplitude event according to a first runlength coding method and codewords for the non-zero amplitudes in the event according to a first amplitude coding method;
means for forming a codeword for each formed zero-amplitude event in the first region according to a second runlength coding method and a first amplitude coding method;
means for forming zero-amplitude events from the second region of the series of quantized transform coefficients;

means for forming a codeword for each formed zero-amplitude event in the second region according to a third runlength coding method; and means for forming a codeword for each non-zero amplitudes in the second region according to a second amplitude coding method, such that relatively short codewords are formed to represent events that are relatively more likely to occur, and relatively long codewords are formed to represent events that are relatively less likely to occur, wherein the breakpoint value is selected from a finite set of pre-defined breakpoint values according to which of the breakpoints of the set produces the shortest number of bits, or the breakpoint defines a soft boundary between the first and second regions, such that for a block having a sequence of consecutive values all being zero or all being non-zero crosses the breakpoint, the boundary between the first and second region is at or after the end of the sequence such that the whole sequence or any event that starts in the first region is in the first region.

46. An apparatus as recited in claim 45, wherein the means for forming the codeword includes:

means for storing a table for each of the first, second, and third runlength coding methods, and for storing a table for the first and second amplitude coding methods, and means for looking up each of the tables according to the coding method.

47. An apparatus as recited in claim 45, wherein at least one of the means for forming codewords forms fixed length codewords for at least some of the events.

48. An apparatus as recited in claim 47, wherein each fixed length codeword includes an escape code.

49. An apparatus to encode an ordered series of quantized coefficients comprising:

an event recognizer to recognize runs of consecutive zero-amplitude coefficients and runs of consecutive non-zero-amplitude coefficients in a first contiguous region of the series defined by a breakpoint in the ordering, the breakpoint defining the first contiguous and a second contiguous region following the first region in the series, the event recognizer further to recognize runs of consecutive zero-amplitude coefficients in the second region, the recognizer forming the runlengths of the zero and non-zero amplitudes in the first region, the non-zero amplitudes in the non-zero runs in the first region, the runlengths of zero-amplitudes in the second region, and the non-zero amplitudes in the second region; and an encoder coupled to the event recognizer, the encoder accepting and forming a codeword for each of the runlengths of non-zero-amplitudes in the first region, for each of the runlengths of zero-amplitudes in the first region, for each of the non-zero amplitudes in the first region, and further encoding the runlengths of zero-amplitudes in the second region, and the non-zero amplitudes in the second region, such that the apparatus forms relatively short codewords to represent combinations that are relatively more likely to occur, and relatively long codewords to represent combinations that are relatively less likely to occur, wherein the breakpoint value is selected from a finite set of pre-defined breakpoint values according to which of the breakpoints of the set produces the shortest number of bits, or the breakpoint defines a soft boundary between the first and second regions, such that for a block having a sequence of consecutive values all being zero or all being non-zero crosses the breakpoint, the boundary between the first and second region is at or after the end of the sequence such that the whole sequence or any event that starts in the first region is in the first region.

50. An apparatus as defined in claim 49, wherein the encoder is a lookup device coupled to the event recognizer and determining the codeword for at least some of the events by looking up tables of codewords for recognized events, the tables stored in a memory.

51. An apparatus as recited in claim 49, wherein the encoder forms fixed length codewords for at least some of the events.

52. An apparatus as recited in claim 51, wherein each fixed length codeword includes an escape code.

53. An apparatus as recited in claim 49, wherein the event recognizer further forms an indication for when all the remaining coefficients in the series have amplitude 0.

54. A method to decode a bitstream in order to form a series of quantized coefficients of a transform of a block of image data, the transform such that 0 is the most likely coefficient amplitude and 1 is the next most likely coefficient amplitude, the bitstream encoded by a method that includes:

recognizing events in a first contiguous region of the series defined by a breakpoint in the ordering, the breakpoint defining the first contiguous and a second contiguous region following the first region in the series, the events including runs of consecutive zero-amplitude coefficients and runs of consecutive non-zero-amplitude coefficients in the first region, the recognizing including forming runlengths of recognized runs;

recognizing events that are runs of consecutive zero-amplitude coefficients in the second region; the recognizing including forming runlengths of recognized runs; and forming a codeword for each of the runlengths of non-zero-amplitudes in the first region using a first runlength coding method, for each of the runlengths of zero-amplitudes in the first region using a second runlength coding method, for each of the non-zero amplitudes in the first region using a first amplitude coding method, and further forming codewords for the runlengths of zero-amplitudes in the second region, and the non-zero amplitudes in the second region, such that the encoding method forms relatively short codewords to represent combinations that are relatively more likely to occur, and relatively long codewords to represent combinations that are relatively less likely to occur, the decoding method comprising:

recognizing a codeword;

determining the event represented by the recognized codeword; and determining the sub-series of coefficients of each determined event, until all coefficients in the series are determined, wherein the breakpoint value is selected from a finite set of pre-defined breakpoint values according to which of the breakpoints of the set produces the shortest number of bits, or the breakpoint defines a soft boundary between the first and second regions, such that for a block having a sequence of consecutive values all being zero or all being non-zero crosses the breakpoint, the boundary between the first and second region is at or after the end of the sequence such that the whole sequence or any event that starts in the first region is in the first region.

55. A method as recited in claim 54, wherein a first coding table is provided containing a plurality of codewords for at least some of the runlengths of non-zero-valued coefficients in the first region, wherein a second coding table is provided containing a plurality of codewords for at least some of the runlengths of zero-valued coefficients in the first region, and wherein the determining of the event for a recognized codeword includes looking up the first or the second table.

56. A method as recited in claim 54, wherein the encoding according to the encoding method is such that fixed length codewords are used to represent a subset of the events.

57. A method as recited in claim 56, wherein each fixed length codeword includes an escape code.

58. An apparatus to decode a bitstream encoded by a coding method, the apparatus comprising:
- a codeword recognizer to accept the bits of the bitstream and recognize a codeword of a set of possible codewords that each represent an event, and
- a decoder coupled to the codeword recognizer to determine the event for the codeword recognized by the codeword recognizer,
- wherein each event that is coded by a set of codewords in the bitstream in a first region defined by a breakpoint is a run of non-zero-valued coefficients coded by a first runlength coding method and a first amplitude coding method, or a run of non-zero-valued coefficients coded by a second runlength coding method, and wherein each event coded in a second region defined by the breakpoint is a run of none or more zero-valued coefficients coded by a third runlength method, or a non-zero amplitude coded by a second amplitude coding method, the breakpoint defining the first region of contiguous coefficients and the second region following the first region, the first, second, and third coding methods being such that relatively short codewords in the bitstream represent events that are relatively more likely to occur, and relatively long codewords represent events that are relatively less likely to occur,
- wherein the breakpoint value is selected from a finite set of pre-defined breakpoint values according to which of the breakpoints of the set produces the shortest number of bits, or the breakpoint defines a soft boundary between the first and second regions, such that for a block having a sequence of consecutive values all being zero or all being non-zero crosses the breakpoint, the boundary between the first and second region is at or after the end of the sequence such that the whole sequence or any event that starts in the first region is in the first region.

59. An apparatus as recited in claim 58, wherein the decoder is a lookup device that looks up a table stored in a memory, the table providing the event for at least some of the codewords of the set of codewords.

60. An apparatus as recited in claim 58, wherein fixed length codewords are used to represent a subset of the events that are represented by codewords in the bitstream.

61. An apparatus as recited in claim 60, wherein each fixed length codeword includes an escape code.

62. A computer readable hardware storage medium having instructions coded thereon that when executed by one or more processors cause execution of a method to encode an ordered series of quantized coefficients, the processing system including a memory configured to store a data structure, the method comprising:
- forming codewords for a set of event formed from the ordered series of quantized transform coefficients of a block of image data, wherein the data structure provides the codewords for the set of events formed from the ordered series of quantized transform coefficients, such that the forming of the codewords includes looking up the data structure,
- wherein an event of the first kind in a first region defined by a breakpoint is a run of non-zero-valued coefficients, an event of the second kind in the first region defined by the breakpoint is a run of zero-valued coefficients, and an event of the third kind in a second region defined by the breakpoint is a run of zero-valued coefficients in the second region, and
- wherein the breakpoint defines a first region of contiguous coefficients of the series, and an immediately following second region of contiguous coefficients,
- wherein the breakpoint has a value selected from a finite set of pre-defined breakpoint values according to which of the breakpoints of the set produces the shortest number of bits, or the breakpoint defines a soft boundary between the first and second regions, such that for a block having a sequence of consecutive values all being zero or all being non-zero crosses the breakpoint, the boundary between the first and second region is at or after the end of the sequence such that the whole sequence is or any event that staffs in the first region in the first region,
- such that relatively short codewords in the data structure stored in the memory represent events that are relatively more likely to occur, and relatively long codewords represent events that are relatively less likely to occur.

63. A computer readable hardware storage medium as recited in claim 62, wherein the data structure is in the form of at least three tables including a first runlength table providing the codeword for the runlength of events of the first kind, a second runlength table providing the codeword for the runlength of events of the second kind, and a third runlength table providing the codeword for the runlength of events of the third kind.

* * * * *

UNITED STATES PATENT AND TRADEMARK OFFICE
CERTIFICATE OF CORRECTION

PATENT NO. : 7,454,076 B2
APPLICATION NO. : 10/869229
DATED : November 18, 2008
INVENTOR(S) : Chen et al.

It is certified that error appears in the above-identified patent and that said Letters Patent is hereby corrected as shown below:

In column 3, line 1, kindly change "tripilet" to --triplet--

In column 3, line 2, kindly change "LEYEL" to --LEVEL--

In column 7, line 63, kindly change "vale" to --value--

In column 8, line 56, kindly change "$S_{+)+EOB}$" to --$S_{+)}+EOB)$--

In column 12, line 21, kindly insert --third-- between "the" and "kind"

In column 13, line 57, kindly insert --one-- between "value" and "or"

In column 15, line 27, kindly insert --a-- between "Thus," and "variable"

In column 26, line 35, kindly replace "staffs" with --starts--

Signed and Sealed this

Twenty-fourth Day of March, 2009

JOHN DOLL
*Acting Director of the United States Patent and Trademark Office*